3,193,151
MOUNTING FOR FUEL PUMP
Charles W. Jeep, Jr., Webster Groves, and Edgar W. Niemeyer, Normandy, Mo., assignors to ACF Industries Incorporated, New York, N.Y., a corporation of New Jersey
Filed Dec. 14, 1962, Ser. No. 244,736
6 Claims. (Cl. 222—180)

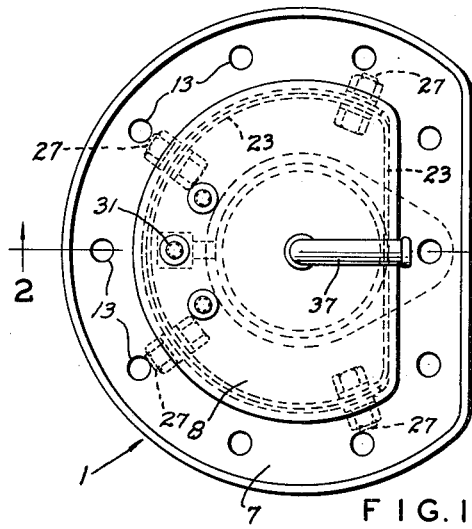
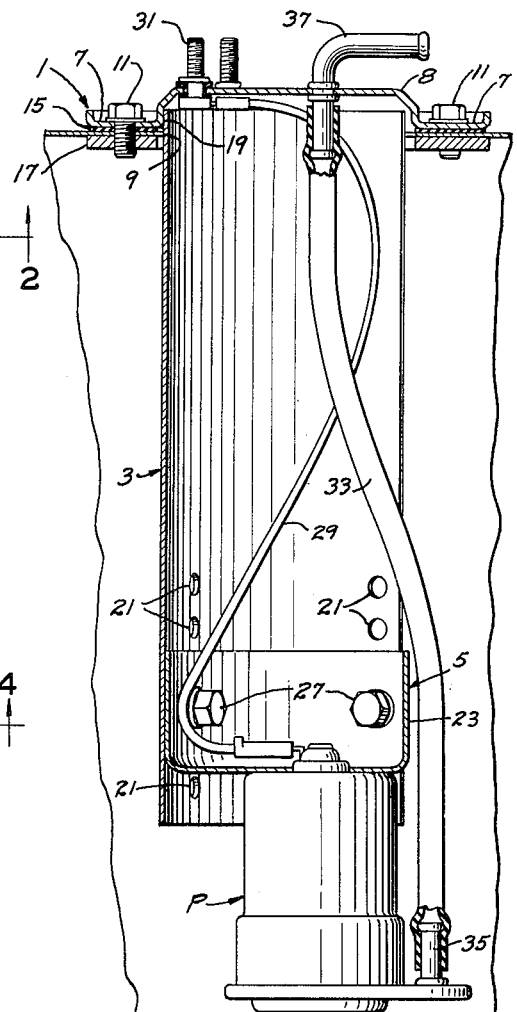
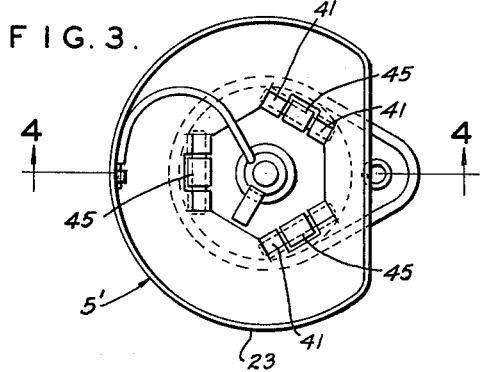
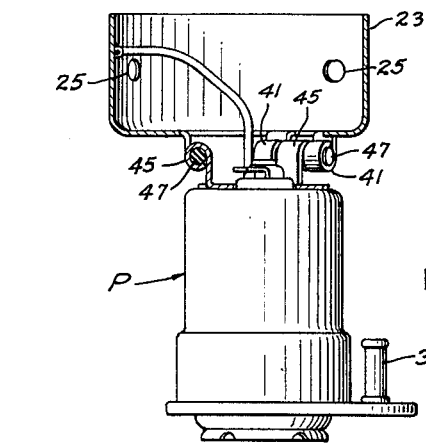
INVENTORS
CHARLES W. JEEP JR.
EDGAR W. NIEMEYER
AGENT

United States Patent Office 3,193,151
Patented July 6, 1965

This invention relates to an assembly for mounting a fuel pump in a fuel tank of an automotive vehicle, and more particularly to a hanger assembly for hanging a fuel pump in a tank with the pump located near the bottom of the tank.

Among the several objects of the invention may be noted the provision of an improved hanger assembly or suspension for hanging a fuel pump near the bottom of a fuel tank, which assembly is of such construction as to avoid damage to or destruction of the assembly due to vibration; the provision of a hanger assembly such as described which is so constructed that its natural resonant frequency is out of the range of the usual environmental frequencies of vibration encountered in the operation of a vehicle, thereby to avoid vibration of the assembly at its natural resonant frequency which would tend to destroy the assembly; the provision of a hanger assembly such as described which is adjustable to permit a pump carried thereby to be located near the bottom of any one of various tanks having various depths; and the provision of a hanger assembly of the class described which is simple and economical in construction. Other objects and features will be in art apparent and in part pointed out hereinafter.

The invention accordingly comprises the constructions hereinafter described, the scope of the invention being indicated in the following claims.

In the accompanying drawings, in which several of various possible embodiments of the invention are illustrated, FIG. 1 is a plan view of a hanger assembly constructed in accordance with this invention;

FIG. 2 is a vertical section through a fuel tank having a hanger assembly attached thereto taken generally on line 2—2 of FIG. 1;

FIG. 3 is a plan view of a modified structure for mounting a fuel pump on the hanger assembly;

FIG. 4 is a vertical section taken on line 4—4 of FIG. 3;

Corresponding reference characters indicate corresponding parts throughout the several views of the drawings.

Figure 6:
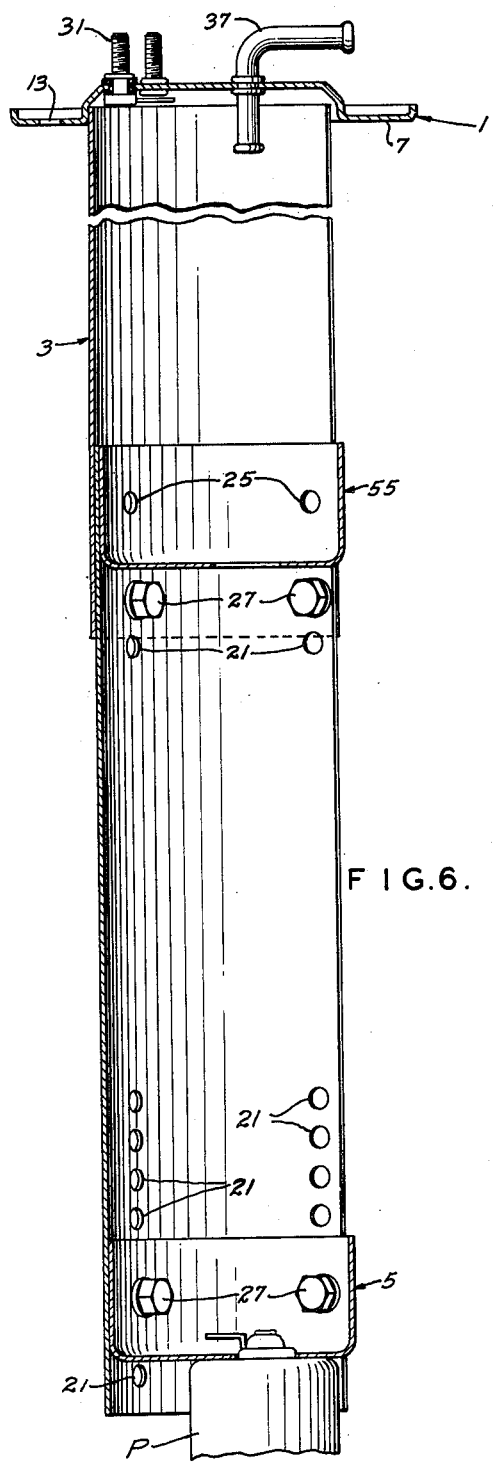
FIG. 6 is a vertical section of a hanger assembly incorporating the extension shown in FIG. 5.

It will be understood that in-tank fuel pumps for automotive vehicles are hung in the fuel tank with the pump near the bottom of the tank, with the hanger assembly removable so that the pump may be removed from the tank for repair or replacement. One of the problems attendant upon such suspensions is that they may be subjected to severe vibration, and particularly so in the case of heavy trucks. In this regard, it will be understood that many trucks have two fuel tanks, and that when one tank becomes empty, fuel is supplied from the other. In such case, the suspension in the empty tank may be subjected to severe vibration for a prolonged time in the absence of the damping effect of fuel in the tank. The vibration problem becomes particularly acute if it should cause a suspension to vibrate at its natural resonant frequency, which may result in destruction of the suspension, and this invention provides a suspension which avoids this.

Referring now more particularly to the drawings, a hanger assembly constructed in accordance with this invention is shown generally to comprise a cap or cover plate 1 secured to the top of a fuel tank T, a hanger 3 connected to and extending downwardly from the cap plate into the tank, and a deep-drawn cup-shaped pump carrier 5 connected to the lower end of hanger 3 and carrying an electric fuel pump P.

Cap plate 1 preferably has an inverted cup-shaped portion 8 and, in horizontal cross section, resembles a major segment of a circle. A peripheral flange 7 extends around the inverted cup-shaped portion 8 of cap plate 1. Cup-shaped portion 8 is in register with a hole 9 in the top of the tank T. The cap plate is secured to the tank by a plurality of bolts 11 extending through holes 13 in the flange 7, a gasket 15, tank T and a clamping ring 17.

Hanger 3 is of channel shape in horizontal cross section, and more particularly is shaped similar to the curved portion of the cup-shaped portion 8 of cap plate 1. The part-cylindrical or C shape of the hanger provides maximum stiffness for a given weight of the hanger, the ratio of the stiffness of the hanger 3 to its weight being such as to keep the natural resonant frequency of the hanger out of the range of the normal environmental vehicle vibration frequencies. The upper end of hanger 3 is in overlapping or face-to-face relation with the inside of the peripheral wall of the cup-shaped portion 8 and is brazed or welded to the wall as indicated at 19. This overlapping joint is strongly resistant to fatigue, which is a significant problem in joints connecting vibrating parts.

Four rows 21 of vertically aligned holes are provided in the lower end of the hanger 3. The fuel pump P is secured by welding, for example, to the bottom of the cup-shaped carrier 5. Carrier 5 has an encircling wall 23 which has four holes 25 therein adapted to register with respective holes in the rows 21 of holes in the hanger 3. Fasteners (bolts) 27 extend through the registered holes to secure the carrier 5 and hanger 3 together. It will be seen that the pump P may be properly located near the bottom of the tank T by adjusting the carrier 5 relative to the hanger 3.

The carrier 5, in addition to carrying the pump P, also contributes to the stiffness of the hanger 3. This added stiffness is due in part to the bottom of the carrier and in part to the encircling wall 23 which extends across the open side of the hanger 3.

As shown in FIG. 2 a suitable electrical connector 29 extends between the upper end of the pump P and an insulated bolt 31 in the cap plate 1. A flexible hose 33 connects the pump outlet 35 with an elbow 37 extending through cap plate 1. The length of the connector 29 and hose 33 is sufficient to permit the carrier 5 to be placed in its lowermost position relative to hanger 3.

A modified pump carrier is illustrated at 5' in FIGS. 3 and 4. Carrier 5' has three pairs of pin-receiving eyes 41 struck downwardly from the bottom thereof. A bracket is secured as by welding, for example, to the upper end of pump P and has three eyes 45 extending upwardly therefrom. The eyes 45 are adapted to be interposed between the respective pairs of eyes 41. Extending through each group of eyes is a resilient pin 47, such as a rubber pin for example. This provides a resilient mounting for the pump carrier.

Figure 5:
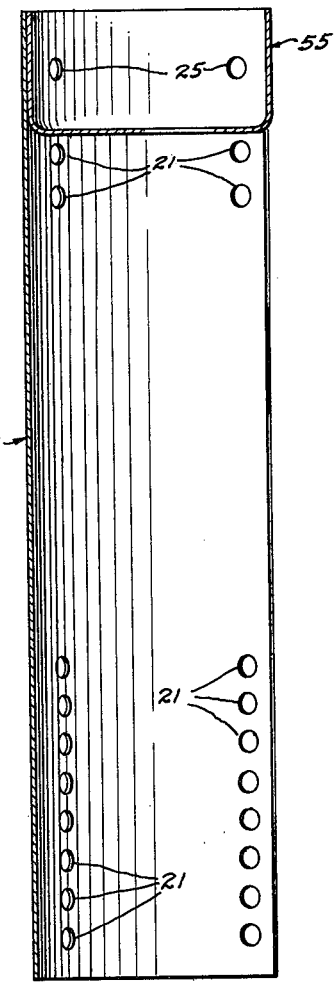
FIG. 5 is a vertical section of an extension adapted to be incorporated in the hanger assembly.

As fuel tanks may vary in depth to a relatively wide extent, the hanger assembly may be provided with an extension 53 (see FIG. 5) for extending the length of the hanger assembly. Extension 53 has a cup-shaped member 55 secured, as by welding for example, in the upper end thereof. Four rows 21 of vertically aligned holes are provided in the upper end of extension 53 as well as in the lower end of the extension. Cup-shaped member 55 has four holes 25 therein in register with four of the holes in upper end of extension 53. The extension 53 is adapted to be telescoped within the lower end of hanger member 3 to any one of several positions wherein four of the holes in extension 53 are in register with four of the holes in hanger member 3. Fasteners 27 extend through the registering holes in the members 53 and 3 for securing these members together.

A carrier 5 or 5' (see FIG. 6) and pump P are attached to the lower end of extension 53 in the same manner as in the embodiments shown in FIGS. 1–4. The cup-shaped member 55 acts as a stiffener for the hanger assembly. It will be understood that other forms of stiffeners could be used, such as bands extending across the open portion of the hanger assembly at various intervals therealong. With the extension hanger member 53, the hanger assembly may be adapted to properly locate a fuel pump near the bottom of various sizes of fuel tanks having a wide range of depths.

In view of the above, it will be seen that the several objects of the invention are achieved and other advantageous results attained.

As various changes could be made in the above constructions without departing from the scope of the invention, it is intended that all matter contained in the accompanying drawings shall be interpreted as illustrative and not in a limiting sense.

What is claimed is:

1. A hanger assembly for hanging a pump in a tank with the pump located near the bottom of the tank, said assembly comprising a cap plate for engagement with the top of a tank and securement thereto, a hanger secured at its upper end to the cap plate and extending downward therefrom, said hanger being adapted to extend down into a tank through a hole in the top of the tank and comprising an upper member and a lower member, said members being of channel shape in horizontal cross section and thereby having a relatively high stiffness to weight ratio, said upper member having at least two rows of vertically aligned holes therein at its lower end, said lower member having at least two rows of vertically aligned holes at its upper end, one hole in each of the two rows of holes in the lower member being in register with a respective hole in each of the two rows of holes in the upper member, fasteners extending through said registering holes to secure said members in nesting relation, and means secured to the lower member within the channel thereof adjacent its lower end carrying a pump.

2. A hanger assembly as set forth in claim 1 wherein said lower hanger member has at least two rows of vertically aligned holes at its lower end, and said means comprises a cup-shaped member having two holes therein in register with two of the holes in the lower end of said lower member and an encircling wall extending across the open side of said lower hanger member, fasteners extending through said registering holes in said cup-shaped member and lower hanger member, and means securing a pump to said cup-shaped member.

3. A hanger assembly as set forth in claim 2 further including means extending across the open side of said hanger intermediate its ends for contributing to the stiffness of said hanger.

4. A hanger assembly for hanging a pump in a tank with the pump located near the bottom of the tank, said assembly comprising a cap plate for engagement with the top of a tank in secured relation, a generally C-shaped hanger secured at its upper end to the cap plate and extending downwardly therefrom, said hanger being adapted to extend into the tank through a hole in a top thereof and being of such shape as to have a relatively high stiffness to weight ratio, a cup-shaped pump carrier removably secured to said hanger and having a circumferential wall extending vertically generally parallel to the hanger and across the open side of the hanger for contributing to the stiffness of the hanger, said carrier having at least two pairs of pin-receiving eyes struck downwardly from the bottom thereof, a bracket positioned beneath the carrier having eyes positioned between the pin-receiving eyes in alignment therewith, and resilient pins extending through the eyes to connect the bracket to the carrier, the bracket being adapted for connection to the upper end of a pump.

5. A hanger assembly for hanging a pump in a tank with the pump located near the bottom of the tank, said assembly comprising a cap plate for engagement with the top of a tank and securement thereto, a hanger adapted to extend down into the tank through a hole in the top of the tank, said hanger comprising a first channel-shaped member secured at its upper end to the cap plate and extending downwardly therefrom, and a second channel-shaped member secured at its upper end to the lower end of said first member and extending downwardly therefrom, said channel-shaped members having a relatively high stiffness to weight ratio and being in nested relation adapted to be adjusted vertically relative to one another, and a generally cup-shaped pump carrier removably secured to the second channel-shaped member and having a circumferential wall extending vertically generally parallel to said channel-shaped member and across the open side thereof for contributing to the stiffness of the hanger.

6. A hanger assembly as set forth in claim 5 further including means separate from said pump carrier extending across the open side of said channel-shaped hanger intermediate its ends for contributing to the stiffness of said hanger.

References Cited by the Examiner

UNITED STATES PATENTS

| | | | |
|---|---|---|---|
| 2,352,958 | 7/44 | Lauer et al. | 222—333 X |
| 2,803,384 | 8/57 | Korte et al. | 222—333 |
| 2,963,203 | 12/60 | Hoelle | 222—385 X |
| 3,074,347 | 1/63 | Clymer. | |

LOUIS J. DEMBO, *Primary Examiner.*